United States Patent Office 3,008,578
Patented Nov. 14, 1961

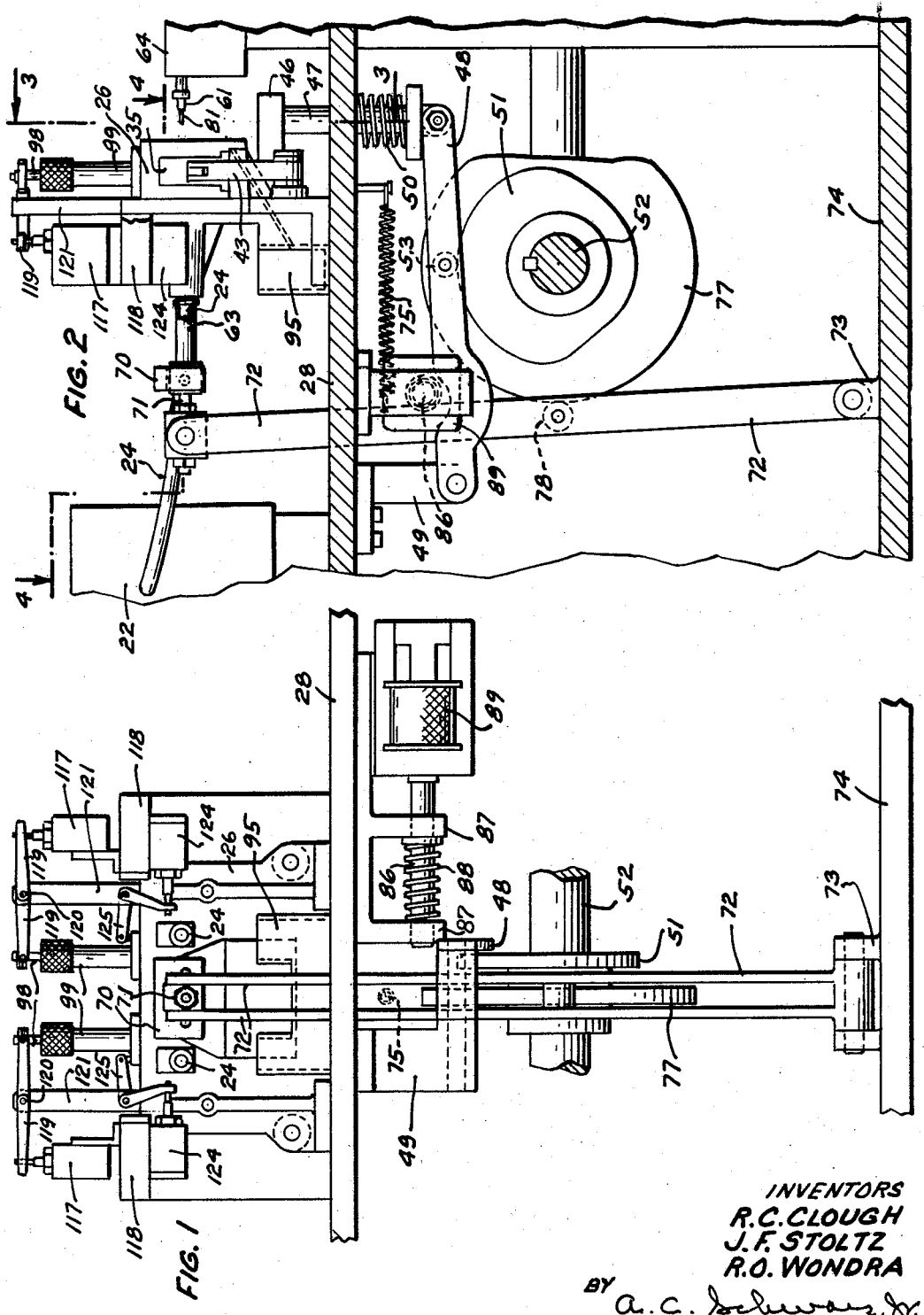

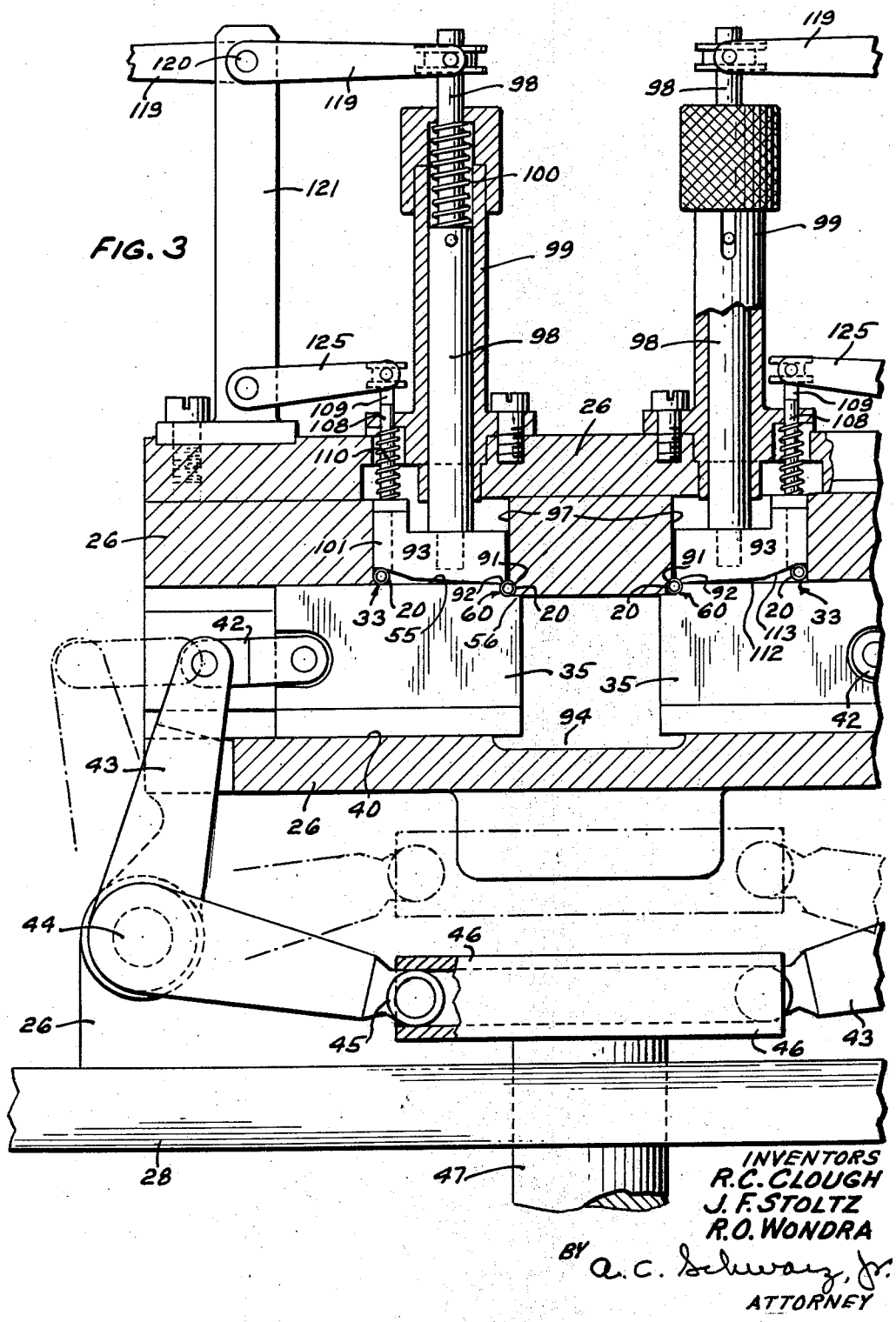

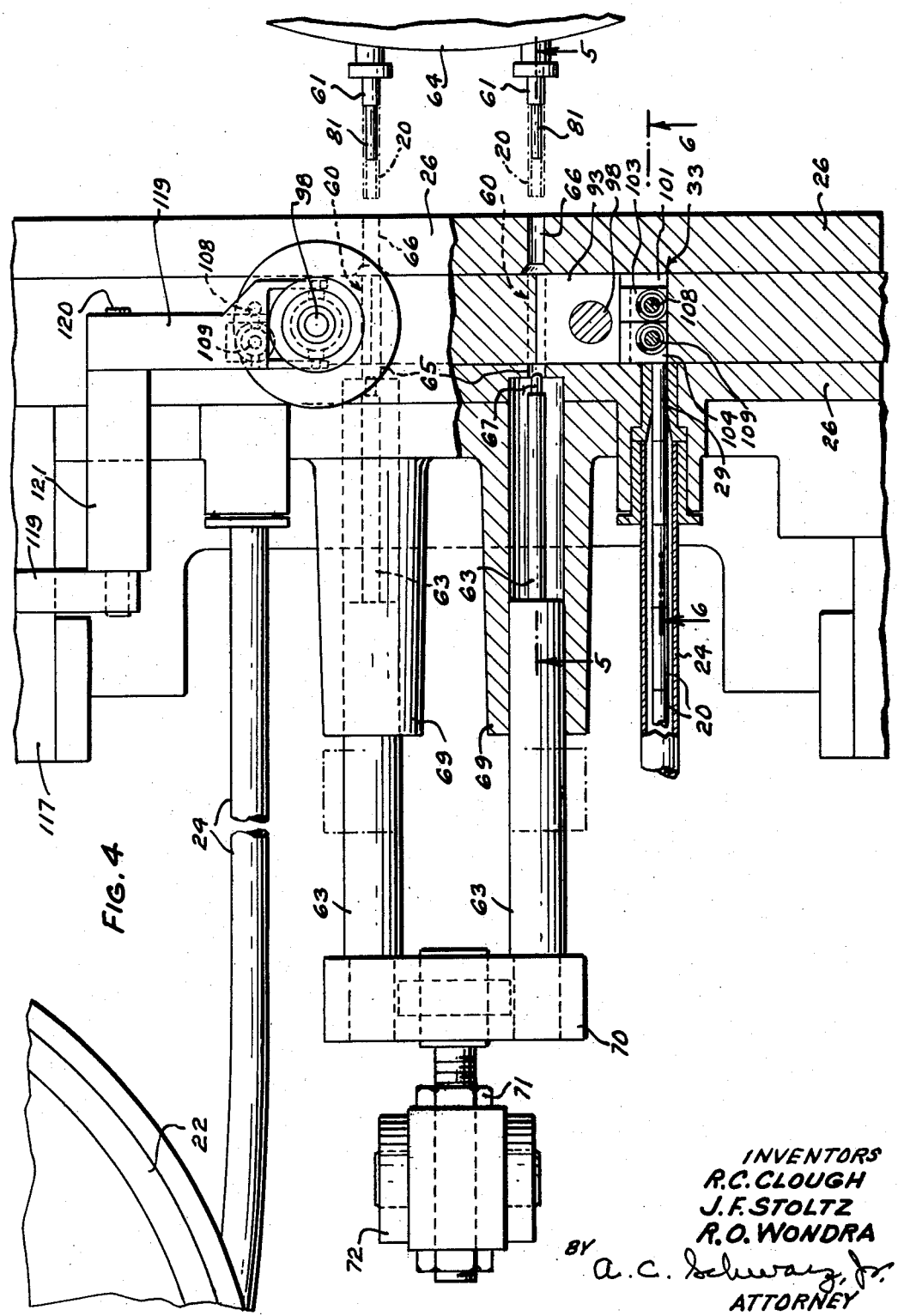

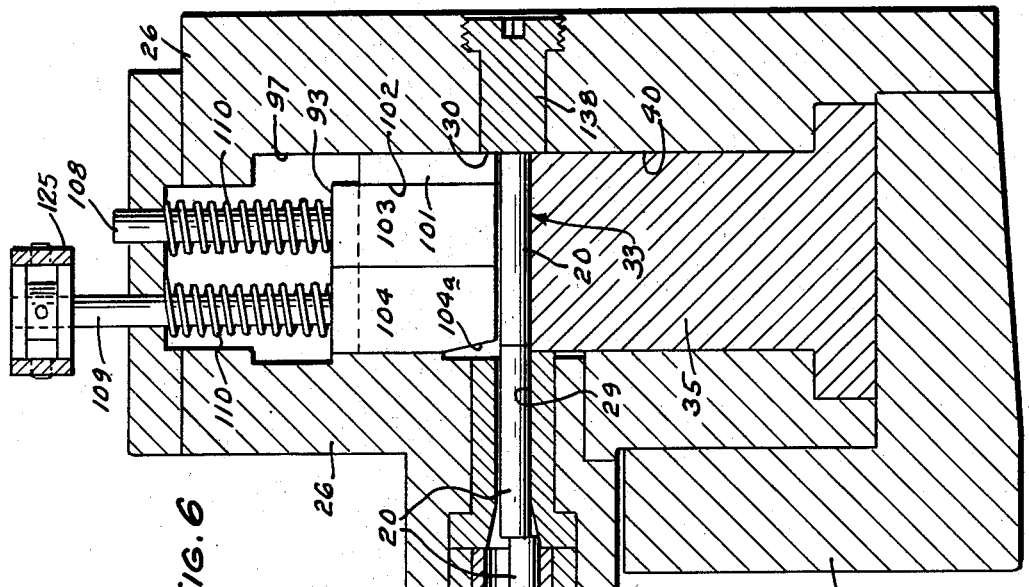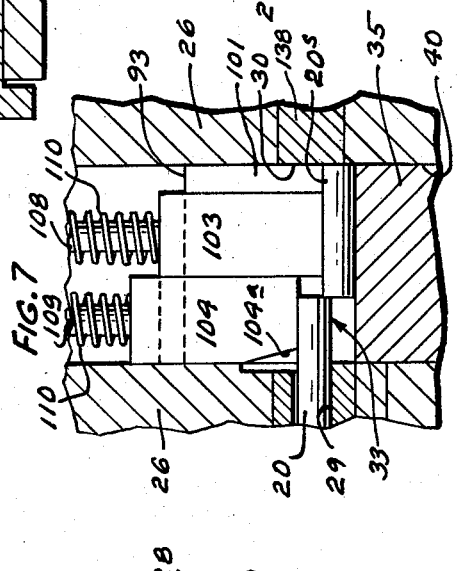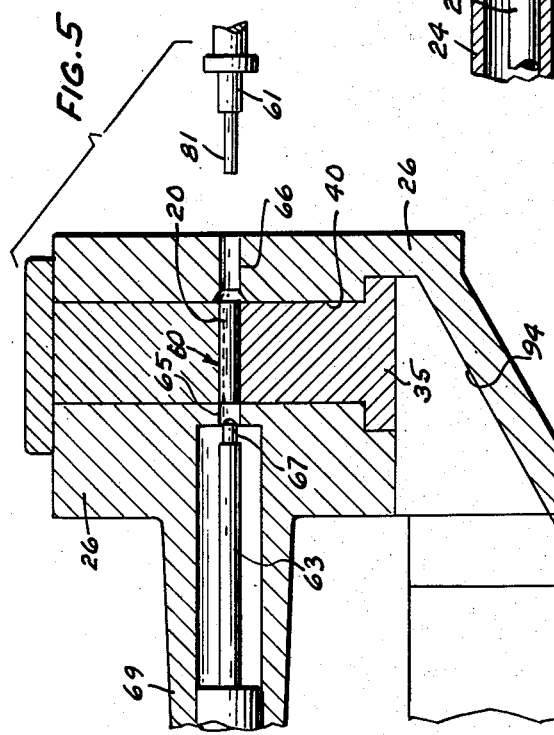

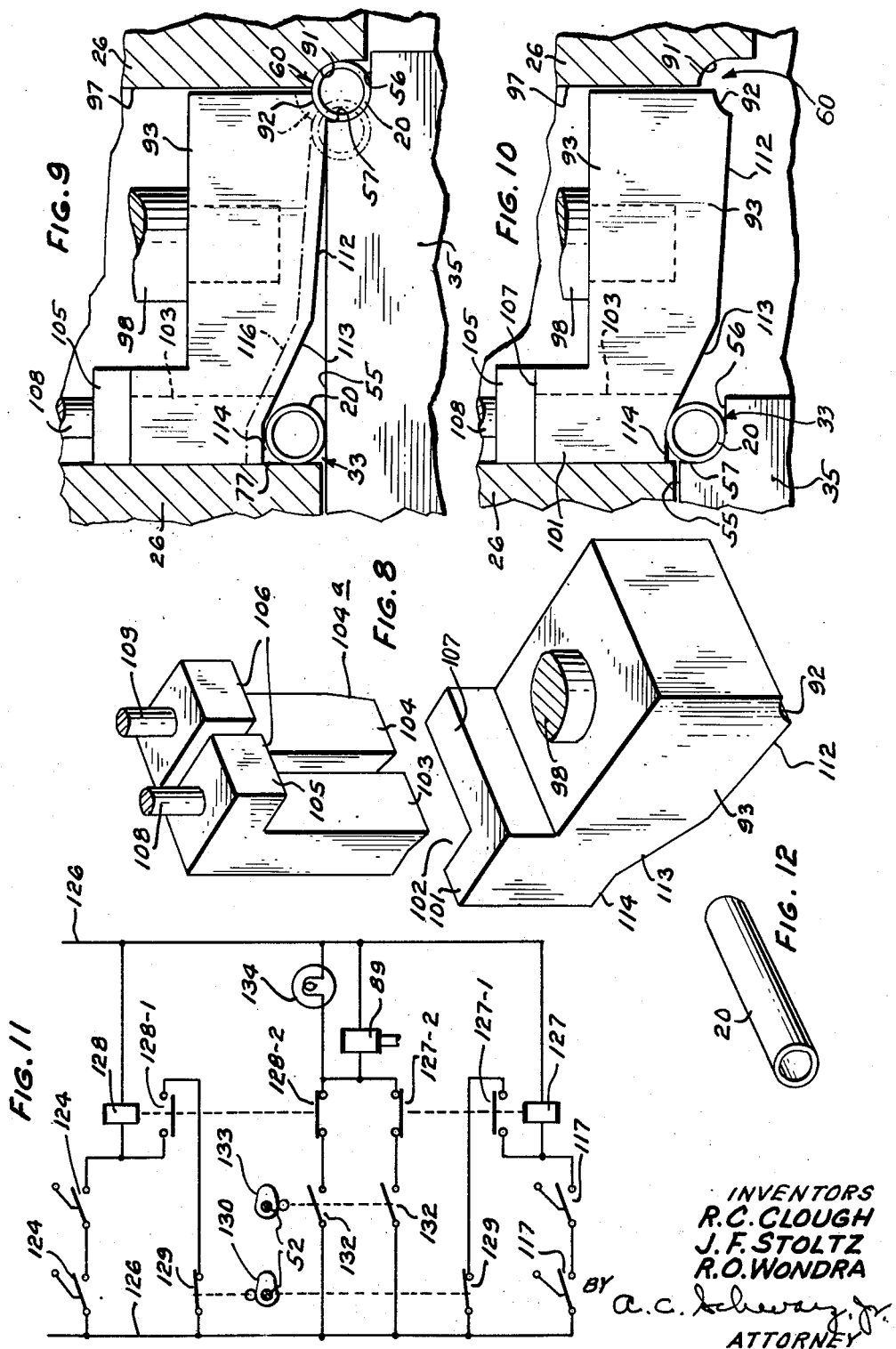

3,008,578
APPARATUS FOR SORTING AND FEEDING ARTICLES
Robert C. Clough, Lombard, James F. Stoltz, La Grange, and Raymond O. Wondra, Downers Grove, Ill., assignors to Western Electric Company, Incorporated, New York, N.Y., a corporation of New York
Filed Jan. 9, 1959, Ser. No. 792,689
8 Claims. (Cl. 209—88)

This invention relates to apparatus for sorting and feeding articles, and more particularly to mechanism for orienting tubular parts, selecting only those parts of a predetermined length and feeding them to a predetermined position onto holders therefor in a machine for fabricating composite articles therefrom.

An object of the present invention is to provide an improved apparatus for sorting and feeding articles.

Another object of the invention is to provide mechanism for orienting articles, selecting only those of predetermined uniform length and feeding them to predetermined positions onto means for receiving them.

Another object of the invention is the provision of an article sorting and feeding apparatus having an improved feeler mechanism for determining full sized and undersized articles.

A further object of the invention is to provide an article sorting and feeding apparatus having novel mechanism for rejecting undersized articles.

An apparatus illustrating certain aspects of the invention may include a guideway for guiding a row of articles along a predetermined path and a vibratory device for orienting the articles and yieldably advancing them through the guideway. A stop is provided for arresting the row of articles in a predetermined position so that a full-size article is disposed just beyond the end of the guideway in a first transfer station whereby when a short article is fed into engagement with the stop, the following article will be supported in the guideway with a portion thereof projecting from the guideway into the transfer station. A slide is reciprocated to transfer the article from the first transfer station to a second transfer station in alignment with a plunger which is selectively operated to transfer full-size articles from the second transfer station to a third position onto a holder for receiving it.

A feeler is yieldably moved across the guideway adjacent the end thereof into engagement with an article in its path by a member actuated by the slide, and the feeler cooperates with a control mechanism for rendering the plunger inoperative when a short article is fed to said second transfer station. The member is vertically operated by an article on the slide and cooperates with the control mechanism for rendering the plunger inoperative when an article is not fed to the second transfer station. This member also serves to push an article from the slide when the slide moves from said second transfer station if the article has not been advanced to said third position.

Other objects and advantages of the invention will become apparent by reference to the following detailed description thereof and the accompanying drawings wherein:

FIG. 1 is a fragmentary front view of the apparatus forming one embodiment of the invention;

FIG. 2 is a fragmentary side view of the apparatus shown in FIG. 1 with parts in section;

FIG. 3 is an enlarged fragmentary vertical cross-sectional view of the apparatus taken on line 3—3 of FIG. 2;

FIG. 4 is a fragmentary plan sectional view of the apparatus taken on the line 4—4 of FIG. 2;

FIG. 5 is an enlarged vertical sectional view through an article-transfer station of the apparatus taken on line 5—5 of FIG. 4;

FIG. 6 is an enlarged vertical sectional view through an article-transfer station of the apparatus taken on line 6—6 of FIG. 4 and showing a normal full-size article therein;

FIG. 7 is a fragmentary vertical sectional view similar to FIG. 6 showing a short article therein and with parts of the apparatus in different positions;

FIG. 8 is an exploded fragmentary perspective view of parts of the apparatus;

FIG. 9 is a fragmentary enlarged vertical sectional view of the apparatus showing an article-transferring slide in its advanced position;

FIG. 10 is a view similar to FIG. 9 showing the article-transferring slide in its retracted position;

FIG. 11 is a wiring diagram of the control for the apparatus; and

FIG. 12 is a perspective view of a tubular article of the kind which is processed in the present apparatus.

Referring to FIG. 12 of the drawings, 20 represents a full-size tubular article having a predetermined length and used in the fabrication of connector-sleeve assemblies for connecting electrical conductors together. Among a supply of these full-size tubular articles 20 is found some short or undersized articles having lengths less than the required length of a full-size article.

In the present apparatus, there are provided two sets of mechanisms simultaneously actuated for orienting the tubular articles, sorting them and rejecting the short ones, and feeding those of a predetermined full size, two at a time, to a predetermined loading position, onto arbors of a machine for fabricating them into said connector-sleeve assemblies. For the most part, the following description will be confined to only a single one of the mechanisms, and like parts of the two mechanisms will be designated with like reference numerals.

Supplies of the tubular articles 20 are placed into a hopper of a well-known type of vibratory device 22 (FIGS. 2 and 4) which orients the articles into end-to-end relationship with one another and advances them into a guide tube 24. This guide tube extends from the device 22 and has one end thereof secured to a composite supporting member 26 mounted on and extending upwardly from a horizontal frame plate 28. The guide tube 24 cooperates with a bore 29 in the member 26 to form a guideway for guiding the row of articles along a predetermined path into a first transfer station 33 and into engagement with a wall 30 (FIG. 6) of the supporting member 26 which arrests the movement of the row of articles with the foremost article 20 disposed in the first transfer station 33 and on a transfer slide 35.

The transfer slide 35 is mounted for movement in a horizontal slideway 40 in the supporting member 26 and is connected by means of link 42 (FIG. 3) to one arm of a bell crank 43 pivotally supported at 44 on the supporting member 26. The bell crank 43 has a roller 45 which rides in a groove in a cross head 46 which is secured to the upper end of a rod 47 mounted for vertical reciprocation in the frame plate 28. The lower end of the rod 47 (FIG. 2) is connected to one end of a lever 48 which is pivotally connected at its other end to a supporting bracket 49 fixed to the underside of the frame plate 28. A spring 50 urges the rod 47 and the lever 48 downwardly and a cam 51 mounted on a drive shaft 52 engages a cam follower 53 on the lever 48 for actuating the lever to reciprocate the transfer slide 35 through a predetermined stroke.

Rabbets formed in the upper end portions of the transfer slides 35 (FIGS. 9 and 10) provide upper and lower article-supporting surfaces 55 and 56, respectively, and a vertical shoulder 57, the upper surface 55 being tangent to the lower portion of the bore 29 in the supporting members 26 to support the articles 20 thereon in a first position at an upper elevation (FIG. 9) while the articles are in the first transfer station 33. When the transfer slide 35 is moved to its retracted position (FIG. 10), the article 20 is moved downwardly onto the lower surface 56 and is supported thereby in a second position at a lower elevation against the shoulder 57 and with a portion of the article 20 extending above the upper surface 55 of the transfer slide 35.

As the transfer slide 35 is moved to its advanced position (FIG. 9), the article 20 is transferred from the first transfer station 33 into a second transfer station 60 in coaxial alignment with an article-supporting arbor 61 (FIGS. 4 and 5) for receiving the article and in axial alignment with a plunger 63 of a second transfer means for transferring the article 20 from the second transfer station 60 to the predetermined loading position onto the arbor 61. The arbors 61 are mounted in pairs on a rotatable table 64 (FIGS. 2 and 4) which is indexed in timed relation to the reciprocation of the slides 35 and the plungers 63 of the two mechanisms to move successive pairs of arbors 61 into the loading position for receiving the articles 20.

As viewed in FIG. 5, the supporting member 26 has an aperture 65 for movement of the plunger 63 therethrough into engagement with the tubular article 20 in the second transfer station 60 and the supporting member 26 has an aperture 66 for permitting movement of the plunger 63 and the tubular article 20 from the second transfer station to the predetermined loading position to transfer the article 20 onto the arbor 61 aligned therewith. The forward end 67 of the plunger 63 is reduced and is insertable in the end of the tubular article 20 for supporting it during movement from the second transfer station 60 to said predetermined loading position in engagement with the arbor 61 which is also provided with a reduced shank 81 for receiving and supporting the tubular article 20 thereon.

The plunger 63 has an enlarged portion slidably mounted in a guide member 69 on the supporting member 26 and as disclosed in FIG. 4, both of the plungers 63 are connected together for simultaneous movement by a head 70 which is connected by a link 71 to the upper end of a lever 72. At its lower end, the lever 72 (FIGS. 1 and 2) is pivotally connected to a bracket 73 on a base plate 74 of the apparatus, and the lever 72 is stressed by a spring 75 to advance the plungers 63 toward the arbors 61. A cam 77 on the drive shaft 52 engages a cam follower 78 on the lever 72 and serves in cooperation with the spring 75 to reciprocate the plungers 63 in timed relation to the movement of the transfer slides 35 and the indexing of the feed table 64 to transfer the tubular articles 20 from the second transfer station 60 onto the arbors 61.

A locking bolt 86 (FIGS. 1 and 2) is provided for locking the lever 72 in its retracted position to render the feeding plunger 63 inoperative and thus prevent the feeding of the tubular article 20 from the second transfer station 60. This locking bolt 86, which is slidably mounted in a bracket 87 on the underside of the frame plate 28, is moved to a normal retracted position by a spring 88 and is actuated forwardly into the path of the lever 72 by a solenoid 89 in response to energization thereof.

Control means, described hereinafter, are provided for energizing the solenoid 89 and rendering the plunger 63 inoperable when an article 20 is not present at the second transfer station 60 for transfer to the arbor 61, and also when a short article is fed to the second transfer station 60. When the lever 72 is locked in inoperative position by the lock bolt 86, an article 20 in the second transfer station 60 at such times is supported on the surfaces 56 at the end portions of the slide 35 (FIG. 9) and is seated in a recess 91 in the supporting member 26 and in an upwardly sloping curved surface 92 in an actuating member 93. When the slide 35 is moved from the second transfer station 60 (FIG. 9) to the first transfer station 33 (FIG. 10) the article 20 it wiped off of the slide 35 by the member 93. The article 20 thus removed from the slide 35, drops down through the horizontal slideway 40 (FIG. 3) onto an inclined chute 94 (FIG. 5) formed in the supporting member 26 and is directed into a removable receptacle 95 therefor.

Referring to FIGS. 3, 9 and 10, the actuating member 93 is slidably mounted in a vertical guideway 97 extending upwardly from the horizontal slideway 40 in the supporting member 26. A guide rod 98 fixed to the member 93 and extending upwardly therefrom is slidable in a sleeve 99 extending upwardly from the supporting member 26, and a spring 100 surrounding the reduced upper end portions of the guide rod urges the actuating member 93 downwardly into engagement with the slide 35 or the article 20 thereon. As seen particularly in FIG. 8, one end of the actuating member 93 is reduced in width to provide a presser finger 101 adapted to overlie an article 20 in the first transfer station 33, and to provide a recess 102 adjacent the presser finger for receiving a presser element 103 and a feeler member 104 therein.

The presser element 103 and the feeler member 104 have laterally projecting portions 105, 106, respectively, which overlie a shoulder 107 on the actuating member 93 for supporting the element 103 and the feeler member 104 for movement therewith while permitting sliding movement relative thereto. Rods 108 and 109 (FIG. 6) extend upwardly from the presser element 103 and the feeler member 104, respectively, through apertures in a portion of the supporting member 26, and springs 110 are provided for stressing the presser member and the feeler member downwardly. As seen more clearly in FIGS. 6 and 7, the presser finger 101 of the actuating member 93, the presser element 103, and the feeler member 104 are arranged side by side in the vertical guideway 97 and are disposed above an article 20 in the first transfer station 33 with the feeler member 104 positioned adjacent the discharge end of the bore 29 of the article guideway.

It will be noted that the feeler member 104 has a sloping surface 104$^a$ to provide for slight variations in length of the full-size articles 20 within allowable manufacturing tolerances and to permit movement of the feeler member downwardly past the end of the following article 20.

The bottom of the actuating member 93 (FIGS. 8–10) includes the curved surface 92 sloping upwardly in one direction, and inclined surfaces 112, 113 sloping therefrom in the opposite direction up to a horizontal surface 114. Vertical reciprocation is imparted to the actuating member 93 by the horizontal movement of the slide 35 and the article 20 carried thereby which engage the sloping surfaces 112, 113 of the member and control the vertical movement thereof.

Reciprocation of the actuating member 93 operates a normally open switch 117 (FIGS. 1 and 11) which is mounted on a bracket 118 and is connected to the upper end of the rod 98 by means of a lever 119 pivotally mounted at 120 on a bracket 121. In a like manner, the reciprocation of the feeler member 104 operates a normally closed switch 124 which is mounted on the bracket 118 and is connected to the upper end of the rod 109 of the feeler member 104 by a bell-crank lever 125 pivotally supported on the bracket 121.

As shown in FIG. 11, the switches 117, 117 are connected across power lines 126, 126 in series with a relay 127 which has normally open contacts 127—1 and normally closed contacts 127—2, and the switches 124, 124 are connected in series with a relay 128 which has normally open contacts 128—1 and normally closed contacts 128—2. The normally open contacts 127—1 and 128—1 are connected in series with normally closed switches 129, 129 which are actuated by a timing cam 130 on the drive shaft 52, the contacts 127—1, 128—1 being closed in response to energization of the relay 127, 128 associated therewith for locking the relays in. The solenoid 89 is connected in series with the normally closed relay contacts 127—2 and a switch 132 in one branch and in series with the relay contacts 128—2 and another switch 132 in another branch. The switches 132, 132 are actuated to closed position by a timing cam 133 on the drive shaft 52. A signal 134 is connected in parallel with the solenoid 89 to indicate when the solenoid is energized and the plungers 63 are inoperative.

The operation of the apparatus will now be described with reference to the simultaneous operation of both article-feeding mechanisms. The articles 20 are oriented in the vibratory-feeding devices 22 into rows and are advanced through the guide tubes 24 with the leading articles positioned in the first transfer stations 33 (FIG. 3) and resting on the upper surfaces 55 of the slides 35. The slides 35 are then retracted to the first transfer stations 33 (FIG. 10) during which movement they ride from under and disengage the actuating members 93 thereby allowing the spring loaded feeler members 104, the presser elements 103 and the presser fingers 101 of the actuating members 93 to move the articles 20 downwardly from their first upper positions (FIG. 9) to their second lower positions (FIG. 10) on the lower surfaces 56 of the slides 35. If the articles 20 are of the specified full length, the feeler members 104, 104 move downwardly with the articles 20 and actuate the switches 124, 124 to energize the relay 128 which locks itself in and also opens relay contacts 128—2. The slides 35 are then advanced to the second transfer stations 60 (FIG. 3) during which movement, the articles 20 carried thereby raise the actuating members 93 above their normal upper positions shown in full lines in FIG. 9 to switch-actuating positions 116, indicated in dotted lines, thereby closing the switches 117, 117. This energizes the relay 127 which locks itself in and opens relay contacts 127—2.

With the relay contacts 127—2 and 128—2 open, the solenoid 89 cannot be energized when the switches 132 are closed by the timing cam 133 and thus the locking pin 86 is retained in its retracted position and the lever 72 and the plungers 63 are rendered effective to transfer the pair of articles 20 from the second transfer stations 60 to the predetermined loading position in engagement with the arbors 61. The timing cam 130 actuates the switches 129, 129 to open the holding circuits and effect the deenergization of the relays 127, 128.

When a short article 20s is advanced into either of the first transfer stations 33, a portion of the second or following article 20 will protrude from the bore 29 of the guideway as shown in FIG. 7 and prevent the actuation of the associated feeler member 104 and its switch 124 during the downward movement of the short article onto the lower surface 56 of the transfer slide 35 when the slide 35 is retracted to the first transfer station 33. With one of the switches 124 open, its associated relay 128 cannot be energized with the result that its relay contacts 128—2 remain closed and when the timing cam 133 closes the switch 132, the solenoid 89 is energized and the lock bolt 86 is advanced to lock the lever 72 in retracted position and thus render the plunger 63 inoperative. The articles 20 will remain at the second transfer station 60 until the slides 35 are moved therefrom, at which time the articles 20 are wiped from the moving slides 35 by the actuating members 93 and fall into the receptacle 95.

In the event that no article 20 is fed from one of the first transfer stations 33 during the normal transfer movement of the slides 35 from the first transfer stations to the second transfer stations 60, one of the actuating members 93 will not be moved up far enough to close the switch 117 associated therewith. This will cause its associated relay 127 to remain deenergized and the relay contacts 127—2 to remain closed whereby when the timing cam 133 closes the switch 132, the solenoid 89 will become energized thereby actuating the locking bolt 86 and causing the plungers 63 to be rendered inoperative.

In the event that a long article having a length greater than that of the acceptable full-size article 20 is fed into the first transfer station 33, one end of such long article will be supported in the bore 29 and will be restrained from movement downwardly and will hold the feeler member 104 in its upper position which in turn will render the plunger 63 inoperative and also energize the signal 134. If the signal continues to be intermittently energized for an extended period of time, the operator may then shut down the apparatus to determine the cause thereof and then remove the offending article. If desired, means may be provided for stopping the operation of the machine in the event that an article becomes jammed in the apparatus and prevents normal movement of the slide 35. To facilitate the removal of the long article, a threaded plug 138 (FIG. 6) is provided in the supporting member 26 which may be removed to permit the withdrawal of the long article 20 from the first transfer station 33 after which the plug is replaced.

From the above description, it will be understood that the present apparatus operates to feed successive pairs of tubular articles 20 of a predetermined length to a predetermined loading position onto successive pairs of arbors 61, and that if either a short tubular article 20s is fed to one of the second transfer stations 60, or if no article is fed to one of the second transfer stations 60 during the article-transferring movement of the slides 35, then the plungers 63 will be rendered inoperative and the articles will not be transferred from the second transferring stations to the arbors 63 but will be pushed from the slides 35 as the slides move from the second transfer station 60 and will drop into the receptacle 95 provided therefor.

It will be understood that the above-described arrangement is simply illustrative of the application of this invention. Numerous other arrangements may be readily devised by those skilled in the art which will embody the principles of the invention and fall within the spirit and scope thereof.

What is claimed is:

1. In an apparatus for sorting and feeding articles, means forming a guideway for guiding a row of advancing articles along a predetermined path, means for stopping said row of articles in a predetermined position so that a full-sized article of a predetermined length is disposed beyond an end of said guideway in a first station, the arrangement being such that when a short article is fed into engagement with said stop means the following article will be supported in said guideway with a portion thereof protruding from the guideway into said first station, means for laterally transferring an article from said first station to a second station, a plunger at said second station mounted for movement parallel to said path for transferring an article from said second station to a predetermined third station, a feeler member, means operable in timed relation to the actuation of said transfer means for yieldably moving said feeler member across the guideway and adjacent to said end thereof into engagement with an article in its path, said feeler member being movable with a full-size article across the guideway but being intercepted by the following article when a short article is fed into said first station, means for actuating said plunger, means controlled by said feeler member for rendering said plunger-actuating means inoperative in response to the feeding of a short article into said first station, and means for removing a small article from said second station.

2. In an apparatus for sorting normal-size articles of predetermined length from underside articles and oversize articles of less length and greater length respectively than said predetermined length, a supporting means having a guideway for guiding a row of advancing articles along a predetermined path, stop means removably mounted on said supporting means for stopping the row of articles in a predetermined position so that a normal-size article is disposed just beyond said guideway in a first station, the arrangement being such that when an undersize article engages said stop means the following article will be supported in said guideway with a portion of said article projecting therefrom in the first station and when an oversize article engages said stop means a portion of said article will be supported in said guideway, a first transfer means for transferring articles from the said first station to a second station, a second transfer means at said second station for transferring articles from said second station to a predetermined loading position, a feeler member, means for yieldably moving said feeler member across said path adjacent to one end of said guideway into engagement with the article in its path in timed relation to the movement of said first transfer means, said feeler member being movable with a full-size article across said path but being intercepted and held against movement by the following article when a short article is fed into said first station, means under control of said feeler member for rendering said second transfer means inoperative, signal means for indicating when said second transfer means is rendered inoperative, said stop means being removable to permit the withdrawal of an oversize article from the first transfer station, and means operable in timed relation to the movement of said first transfer means for removing an article from said second transfer station when said article is undersize and is not transferred to said loading position.

3. In an apparatus for sorting and feeding articles, means forming a guideway for guiding a row of advancing articles along a predetermined path, means for stopping said row of articles in a predetermined position so that a full size article of a predetermined length is disposed beyond an end of said guideway in a first station, the arrangement being such that when a short article is fed into engagement with said stop means the following article will be supported in said guideway with a portion thereof protruding from said guideway into said first station, a slide, means for reciprocating said slide to transfer an article from said first station to a second station, means at said second station for removing the article from said slide during the return movement of said slide from said second station, a plunger at said second station mounted for movement parallel to said path for transferring an article from said second station to a third station, a feeler member, means operable in timed relation to the actuation of said slide for yieldably moving said feeler member across the guideway adjacent to said end thereof into engagement with an article in its path, said feeler member being movable with a full-size article across said guideway but being intercepted by the following article when a short article is fed into the first station, means for actuating said plunger, and means controlled by said feeler member for rendering said plunger-actuating means inoperative.

4. In an apparatus for sorting and feeding full-size articles of a predetermined length, supporting means having side walls spaced apart a distance slightly greater than the length of a full-size article and forming a horizontal slideway and a vertical slideway extending upwardly from the horizontal slideway, a slide movable in the horizontal slideway and having a stepped surface for supporting an article thereon in a first position at an upper level and in a second position at a lower level so that a portion of the article in said second position extends above the slide, means on said supporting means forming a substantially horizontal guideway extending through one of said walls for guiding a row of articles into said vertical slideway and into engagement with the other of said walls to locate the endmost article in said first position on said slide, an actuating member slidably mounted in said vertical slideway and having a sloping lower surface engageable with the article and said slide whereby vertical reciprocation is imparted to said actuating member in response to reciprocation of said slide to raise said actuating member to a normal upper position with a portion thereof disposed above an article in said first position, means for actuating the slide to effect the downward movement of the actuating member and the downward movement of the article from the first position to the second position in response to movement of the slide in one direction and for moving the article laterally from said second position to a third position in response to movement of the slide in the opposite direction, means for transferring the article from the slide in said third position to a fourth position, said article being effective to cam said actuating member upwardly beyond said normal upper position in response to movement of the article from said second position to said third position, and control means operated by said actuating member only when an article is transferred from said second position to said third position for rendering said article-transfer means operative.

5. In an apparatus for sorting and feeding articles of predetermined length, supporting means including a pair of side walls spaced apart a distance slightly greater than the length of the article and forming a horizontal slideway and a vertical slideway extending upwardly from the horizontal slideway, a slide movable in the horizontal slideway and having a stepped surface for supporting an article thereon in a first position at an upper level and a second position at a lower level so that a portion of the article in said second position extends above the slide, means forming a guideway extending through one of said walls for guiding a row of articles into said vertical slideway and into engagement with the other one of said walls to locate the endmost article in said first position on said slide, the arrangement being such that when a short article is advanced into engagement with said other wall a portion of the following article will protrude from said guideway, means for actuating the slide to effect the downward movement of the article from the first position to the second position in response to movement of the slide in one direction and for moving the article laterally from said second position to a third position in response to movement of the slide in the opposite direction, means for transferring the article from said third position to a fourth position, a feeler member slidably mounted in said vertical slideway for movement across said guideway adjacent an end thereof, means for yieldably moving said feeler element into engagement with an article in its path in timed relation to the reciprocation of the slide, means under control of said feeler element for rendering said transfer means operative when a full-size article is transferred to said third position and said transfer means inoperative when a short article is transferred to said third position, and means for removing from said slide at said third position an article which is too short and has not been transferred therefrom to said fourth position.

6. In an apparatus for sorting and feeding full-size articles of predetermined length, means for forming a guideway for guiding a row of the articles along a predetermined path, means for stopping said row of articles in a predetermined position with a full-size article disposed beyond an end of said guideway in a first transfer station, the arrangement being such that when a short article is fed into engagement with said stop means the following article will be supported in said guideway with a portion thereof projecting from the guideway into said first station, a slide, means for reciprocating the slide for transferring an article from said first transfer station to a second transfer station, a plunger at said second transfer station, resilient means for urging said plunger in one direction to transfer an article from said second transfer station to a third station, rotary cam means operable in timed relation to the reciprocation of the slide for moving said plunger in the opposite direction to a retracted position, a reciprocable actuating member operated by the slide and an article thereon, locking means under control of said actuating member for locking said plunger in retracted position when no article is fed by said slide to said second transfer position, said actuating member serving to push the article from the slide as the slide moves from said second transfer position, a feeler yieldably mounted on said actuating member and moved thereby across the guideway adjacent said end thereof into engagement with an article in its path, said plunger-locking means being controlled by said feeler member to lock said plunger in said retracted position in response to the transfer of a short article from said first transfer station to said second transfer station.

7. In an article sorting and feeding apparatus, supporting means having a first transfer station and a second transfer station in horizontally spaced relation to each other, means for advancing articles successively to said first transfer station, a slide having a rabbetted end portion for receiving an article therein at said first transfer station, means for reciprocating the slide to transfer the article from said first transfer station to said second transfer station, a downwardly stressed member slidably mounted on said supporting means above said slide and having a first inclined surface sloping in one direction engageable with the slide and an article thereon for moving said member vertically in response to reciprocation of said slide and for yieldably retaining the article on the slide and having an inclined surface sloping in the opposite direction engageable with the article in said second transfer station for preventing return movement of the article with said slide, transfer means at said second transfer station operable in timed relation to said slide for transferring the article from said second transfer station to a predetermined position, and control means operated by the movement of said downwardly stressed member for rendering said transfer means inoperative when an article is not transferred from said first transfer station to said second transfer station.

8. In an article sorting and feeding apparatus, supporting means having a first transfer station and a second transfer station in horizontally spaced relation to each other, means for advancing articles successively to said first transfer station, a slide having a seat thereon for receiving an article therein at said first transfer station, means for reciprocating the slide to transfer the article from said first transfer station to said second transfer station, a downwardly stressed member slidably mounted on said supporting means above said slide and having a first inclined lower surface sloping in one direction engageable with the slide and an article thereon for yieldably retaining the article in said seat and having an inclined lower surface sloping in the opposite direction engageable with the article in said second transfer station for removing the article from said slide during the return movement of said slide from said second transfer station, means operable in timed relation to said slide for transferring the article from said second transfer station to a predetermined position, a feeler actuated by said member for sensing the length of said articles at said first transfer station, and means under control of said feeler for rendering said article transferring means ineffective when a short article is sensed.

References Cited in the file of this patent

UNITED STATES PATENTS

| | | |
|---|---|---|
| 2,464,830 | Shellem et al. | Mar. 22, 1949 |
| 2,560,446 | Jagen | July 10, 1951 |